July 16, 1963     T. S. LOESER     3,097,764
PROPORTIONING SYSTEM
Filed Feb. 9, 1960
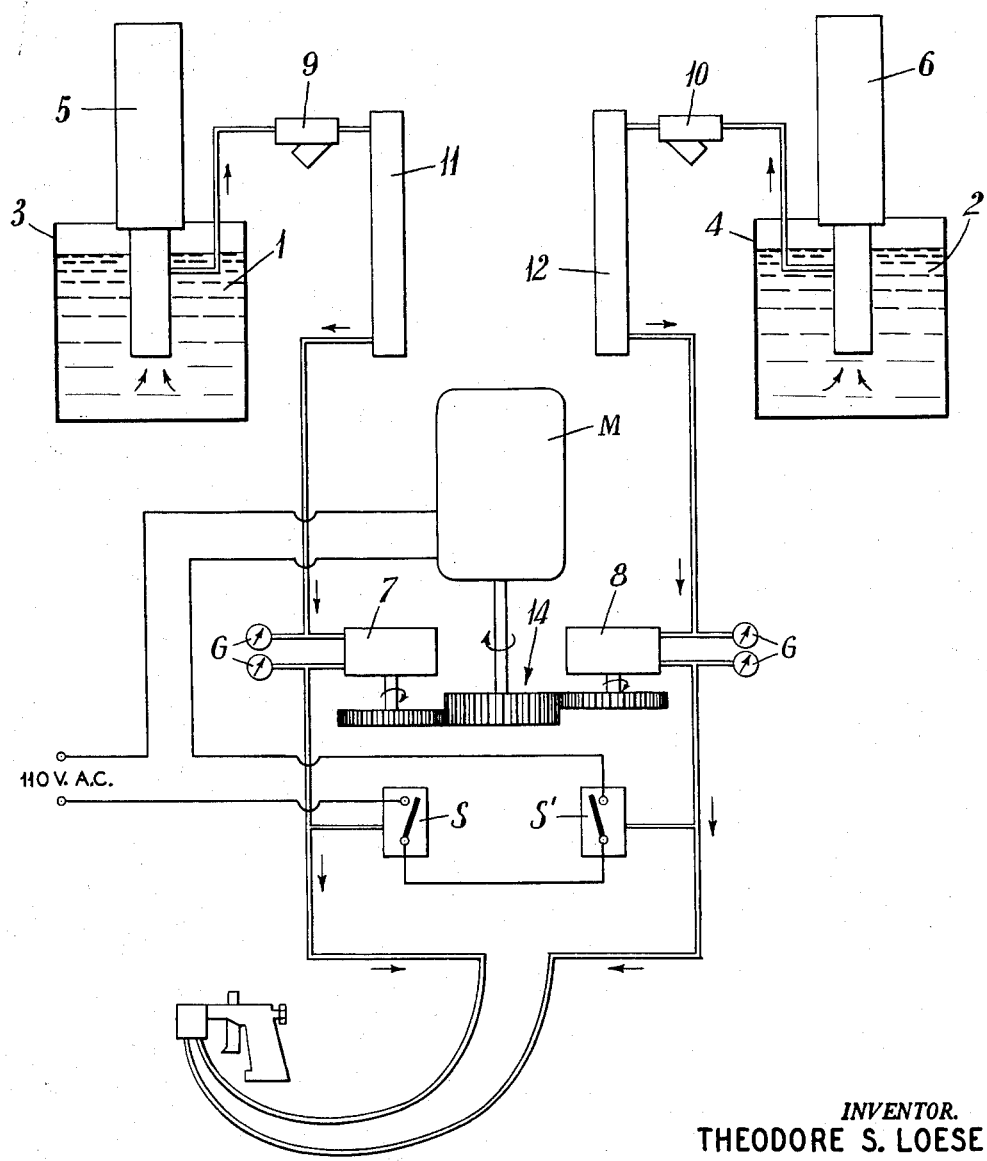
INVENTOR.
THEODORE S. LOESER
BY
ATTORNEY ര
United States Patent Office 3,097,764
Patented July 16, 1963

3,097,764
PROPORTIONING SYSTEM
Theodore S. Loeser, New Brunswick, N.J., assignor to Union Carbide Corporation, a corporation of New York
Filed Feb. 9, 1960, Ser. No. 7,621
4 Claims. (Cl. 222—55)

This invention relates to a proportioning system for controlling and regulating the volumetric flow of at least two liquids to a mixing and spraying head in which the liquids are admixed and from which the admixed liquids are discharged.

Proportioning systems must meet several requirements in order to be suitable for metering liquids to a mixing and spraying head such as a spray gun from which the admixed liquids are discharged in the form of a spray and applied as a coating on various surfaces. For example, suitable proportioning systems must accurately meter and maintain a uniform and constant volumetric flow of liquids under both high and low pressures to a mixing and spraying head irrespective of any difference in the physical properties of the liquids, for instance, a difference in viscosity. Accurate metering is especially important when the properties of the end-product which is discharged from the mixing and spraying head are dependent upon the relative volumetric proportions in which the liquids were admixed, which in turn depends upon the relative volumetric proportions in which the liquids were fed to the mixing and spraying head.

Heretofore, known proportioning systems have been deficient in that at relatively high pressures, i.e., at pressures in excess of about 400 p.s.i.g., they deliver substantially less material than their theoretical delivery. That is, they deliver less material per unit of time than that for which they are rated at the particular speed, i.e., revolutions per minute with respect to a rotary pump and strokes per minute with respect to a reciprocating pump, and delivery pressures at which they are operating. Consequently, such proportioning systems have found little, if any, utility for metering viscous liquids or for metering liquids containing solid particulate material, such as pigments and fillers, due to the relatively high pressures required for metering such liquids. Moreover, these proportioning systems have proved to be incapable of accurately metering liquids which are of a different viscosity.

Accordingly, the present invention provides for metering and maintaining a uniform and constant volumetric flow of liquids, under both high and low pressures and irrespective of any differences in the viscosity of the liquids or the presence therein of solid particulate material, to a mixing and spraying head in which the liquids are admixed and from which the admixed liquids are discharged. The proportioning system of the present invention is particularly advantageous for accurately metering liquid epoxy resins and liquid hardeners therefor in desired volumetric proportions to a mixing and spraying head in which the epoxy resin and hardener are admixed and from which the admixed materials are discharged and applied as coatings on various surfaces.

Referring now to the accompanying drawing which is a schematic view showing one embodiment of the proportioning system of the present invention and which will be described, for convenience, in reference to the metering of an epoxy resin and a hardener for the epoxy resin to a conventional spray gun, an epoxy resin 1 is pumped from a container 3 by means of pressure pump 5 and fed through conduits to a positive displacement, volumetric metering pump 7 under a predetermined pressure P which provides metering pump 7 with a constant and uniform flow of epoxy resin 1 when the metering pump 7 is in operation, metering a uniform and constant volumetric flow of epoxy resin 1 to the spray gun. Similarly and simultaneously, the hardener 2 is pumped from container 4 by means of pressure pump 6 and fed through conduits to a positive displacement, volumetric metering pump 8 under a predetermined pressure P' which provides metering pump 8 with a constant and uniform flow of hardener 2 when the metering pump 8 is in operation metering a uniform and constant volumetric flow of hardener to the spray gun.

Pressure pumps 5 and 6 are operated so that a constant and uniform pressure P and P' is maintained on the epoxy resin 1 and hardener 2 respectively so that upon operation of the volumetric metering pumps 7 and 8, a uniform and constant flow of liquids is maintained to the metering pumps. The pressure exerted by pressure pumps 5 and 6 on epoxy resin 1 and hardener 2 respectively is sensed and indicated by pressure gages (not shown) at each pressure pump. The pressure exerted by each pressure pump can be varied as desired, as for example by increasing or decreasing the air pressure of an air-operated pressure pump which results in an accompanying increase or decrease in pressure on the liquids.

Pressure exerted by pumps 5 and 6, designated as P and P' respectively, can be the same or different. When the proportioning system is in operation with material being discharged from the spray gun, pressure pumps 5 and 6 are operated to provide material to metering pumps 7 and 8 respectively at intake pressures which are substantially equal to the discharge pressures under which material is being discharged from the metering pumps. By feeding each liquid into and out of each metering pump at substantially the same pressure, the effective pressure across each metering pump is substantially zero. Thus, there is substantially no pressure differential across the metering pumps with the result that there is no leakage of material, so-called "slippage" past the impeller of either metering pump toward the side of lowest pressure. Each metering pump, therefore, accurately meters its theoretical volumetric displacement.

The discharge pressure of each metering pump 7 and 8, which is required for feeding the desired volumetric quantities of liquids into and out of a spray gun, is predetermined and governed by (1) the volumetric displacement rate of each metering pump, which in turn is controlled by the speed of the pump, (2) the pressure drop through the conduit connecting the discharge end of each metering pump with the spray gun, (3) the viscosity of the liquid which is handled by each metering pump and (4) the size of the discharge orifice of the spray gun. The discharge pressure of each pump can be increased or decreased by increasing or decreasing the speed at which each pump is operating.

The volumetric displacement of each metering pump can be the same as shown in the accompanying drawing, or different. Ratio of volumetric quantities of liquids which are being metered to the spray gun can be varied as desired by using metering pumps of different volumetric displacement and operating each metering pump at the same speed, by using metering pumps having the same volumetric displacement and operating each pump under a different speed, or by using metering pumps having different volumetric displacements and operating each pump at different speeds.

The clearance between the impeller (not shown) and the impeller housing of each metering pump can also be the same or different. With the present proportioning system, clearances as great as 0.003 of an inch can be tolerated when metering liquids ranging in viscosity from about 200 centipoises to about 16,000 centipoises at 25° C. without affecting the accuracy of the system.

Metering pumps 7 and 8 can be simultaneously driven through a common driving means as is shown in the accompanying drawing, wherein variable speed motor M mechanically drives both metering pumps 7 and 8 through a gear train 14. Gear ratios of gear train 14 can be changed as desired to change the speed at which each pump is operating, thus varying the ratio of the volumetric quantities of liquids fed to the spray gun. Alternatively, metering pumps 7 and 8 can be operated independently of each other so long as they are synchronized to deliver the desired volumetric quantities of liquids to the spray gun.

The operation of metering pumps 7 and 8 is automatically controlled. In the embodiment shown in the accompanying drawing, wherein metering pumps 7 and 8 are driven by variable speed motor M through gear train 14, the operation of the metering pumps 7 and 8 is automatically controlled by conventional pressure actuated, electrical switches S and S' respectively which are positioned to sense the discharge pressure of each metering pump and connected, in series, to each other and to the variable speed motor M through an electrical circuit. Pressure actuated, electrical switches S and S' are set to close, thus closing the electrical circuit, which in turn starts variable speed motor M which drives metering pumps 7 and 8 through gear train 14 when the discharge pressures of both metering pumps 7 and 8 drop below their respective predetermined values. These switches are set to open, thus opening the electrical circuit stopping the variable speed motor M when the discharge pressure of either metering pump exceeds the respective predetermined values.

Conduits through which the epoxy resin 1 and the hardener 2 are pumped and fed to metering pumps 7 and 8 can, if desired, be provided with strainers 9 and 10, as shown in the drawing, to insure elimination from the liquids of any material which might tend to clog the proportioning system, interrupting its effective and continuous operation. Also, if desired, the conduits can be provided with heaters 11 and 12 on the intake side of metering pumps 7 and 8, as shown in the accompanying drawing, which can be used to heat one or more of the liquids, reducing the viscosity thereof to a desired value. Rather than positioning heaters 11 and 12 on the intake side of metering pumps 7 and 8, the heaters can also be positioned on the discharge side of the metering pumps. Heaters can also be positioned on both the intake side and discharge side of each metering pump. Alternatively, the liquids can be heated in their containers rather than using heaters as described.

OPERATION

In operation of the proportioning system of the present invention when used in conjunction with a spray gun, metering pumps 7 and 8 are set to operate at a predetermined, discharge pressure. With metering pumps 7 and 8 set to operate at a predetermined pressure, pressure actuated, electrical switches S and S' are set to close the electrical circuit starting variable speed motor M which drives metering pumps 7 and 8 through gear train 14 when the discharge pressures at which metering pumps 7 and 8 are set to operate is less than their respective predetermined values. These switches are also set to open, interrupting the electrical circuit stopping variable speed motor M when the discharge pressure of either metering pump exceeds its predetermined value. Pressure pumps 5 and 6 are started and are operated to exert a pressure on epoxy resin 1 and hardener 2 which is substantially equal to the discharge pressure of each metering pump. Actually, if desired, pressure pumps 5 and 6 can be operated at pressures which are about 50 p.s.i.g. less than the discharge pressures of the metering pumps. With pressure pumps and metering pumps set as described, the spray gun is held in the hand of the operator and the trigger of the spray gun is pulled rearwardly. Moving the trigger of the spray gun rearwardly acts to open the discharge orifice of the gun which results in a discharge of a mixture of epoxy resin and hardener. Discharge of a mixture of liquids from the spray gun results in a pressure drop occurring in the conduits connecting the volumetric metering pumps and the spray gun below the predetermined discharge pressure of each of the metering pumps. Pressure switches, in effect, sense this pressure drop and close the electrical circuit to variable speed motor M which in turn drives the metering pumps 7 and 8 through gear train 14. With metering pumps 7 and 8 in operation, a metered and constant volumetric flow of liquids is fed to and discharged from the spray gun. When the proportioning system is in operation, the intake and the discharge pressures of each metering pump are conveniently indicated to the operator by conventional pressure gages G mounted at the intake and the discharge side of each metering pump as is shown in the accompanying drawing. Intake and discharge pressures to and from the metering pumps can be adjusted as desired in the manner previously described. When the trigger of the spray gun is released, the discharge orifice closes, preventing any discharge of liquids. This causes the discharge pressure of each metering pump to exceed its predetermined value almost instantaneously with the result that switches S and S' open stopping variable speed motor M, which in turn stops the operation of the metering pumps and thus the proportioning system.

Although the proportioning system of the present invention has been described with respect to the metering of an epoxy resin, such as a liquid diglycidyl ether of 2,2'-bis-(p-hydroxyphenyl)propane and a hardener for the epoxy; other resins, such as polyurethanes, polyesters, and mixtures thereof can also be metered, along with various hardening agents, catalysts and the like for these resins. The particular hardening agent will depend upon the resin used. For epoxy resins, it is customary to use amine hardeners, such as metaphenylene diamine, pyridine, triethylene tetramine, and the like. The resins and hardeners can also contain fillers, pigments, and other modifying agents which are well known in the art. Also, more than two liquids can be proportioned using the proportioning system of the present invention using one pressure pump and one metering pump for each liquid as described in this specification.

The following example further illustrates the present invention and is not intended to limit the scope thereof in any manner.

Example 1

A liquid diglycidyl ether of 2,2-bis-(p-hydroxyphenyl)-propane manufactured by Union Carbide Plastics Company, a division of Union Carbide Corporation, having an epoxy equiv. weight of about 190 was metered to a spray gun and combined therein with an amine hardener, i.e., hydroxyethyl diethylene triamine using the proportioning system of the present invention. The epoxy resin and the amine hardener were pumped from their respective containers by means of Graco pneumatic pressure pumps, one pressure pump provided for each container. Each pressure pump developed 8 p.s.i.g. fluid pressure per p.s.i.g. of air pressure.

The epoxy resin was pumped out of its container and fed to a Gerotor gear type metering pump at a pressure of 800 ps.i.g. The amine hardener was pumped out of its container and fed to a second Gerotor gear type metering pump at 600 p.s.i.g. On being fed from their containers to the metering pumps, both epoxy resin and hardener were passed through 40 mesh screens and heaters which were at a temperature of 120° F. Both sets of screens and heaters were on the intake side of metering pumps in the order shown in the accompanying drawing.

The displacement of the metering pump which metered the epoxy resin was 1.6 gallons per minute at 1800 r.p.m. The displacement of the metering pump which metered the amine hardener was 0.4 gallon per minute at 1800 r.p.m. Each metering pump was driven through a gear train having a gear ratio of 1:1 by a motor operating at 150 r.p.m. With the arrangement described, the discharge pressure of the metering pump which metered the epoxy resin was 800 p.s.i.g. The discharge pressure of the metering pump which metered the amine hardener was 600 p.s.i.g. Pressure switches for each metering pump were set to close and open based on the discharge pressure of each pump as previously described. On using the spray gun, also as described above, epoxy resin and amine hardener were combined in a volumetric ratio of four parts epoxy resin per one part amine hardener, discharged from the spray gun in a spray and applied as a coating on a steel surface. The sprayed coating was uniformly smooth and cured at room temperature (25° C.) in about four hours.

The spray gun used is described in United States Patent 2,890,836 to F. E. Gusmer, et al.

What is claimed is:

1. A proportioning system particularly adaptable for feeding an epoxy resin and hardener therefor in accurately metered, volumetric proportions to a mixing and spraying head in which the epoxy resin and hardener are admixed and from which the admixed materials are discharged comprising separate containers for said epoxy resin and for said hardener, a positive displacement, volumetric metering pump connected to each container through a conduit, means for feeding each material from its container to the metering pump connected thereto, means for operating each of said metering pumps, said metering pumps operating at a discharge pressure substantially equal to their intake pressure whereby each of said materials is fed through its metering pump under substantially zero pressure differential and to a mixing and spraying head in accurately metered, volumetric quantities, and sensing means, mounted at each metering pump and connected in series to each other and to the means which operates each of said metering pumps, for sensing the discharge pressure of said metering pumps and in response thereto, starting the operation of said metering pumps when the discharge pressure thereof is less than the predetermined discharge pressure and stopping the operation of said metering pumps when the discharge pressure thereof is greater than the predetermined discharge pressure.

2. A proportioning system particularly adaptable for feeding an epoxy resin and hardener therefor in accurately metered, volumetric proportions to a mixing and spraying head in which the epoxy resin and hardener are admixed and from which the admixed materials are discharged comprising separate containers for said epoxy resin and for said hardener, a positive displacement, volumetric metering pump connected to each container through a conduit, means for feeding each material from its container to the metering pump connected thereto, means for operating each of said metering pumps, said metering pumps operating at a discharge pressure substantially equal to their intake pressure whereby each of said materials is fed through its metering pump under substantially zero pressure differential and to a mixing and spraying head in accurately metered, volumetric quantities, and sensing means, mounted at each metering pump and connected in electrical series to each other and to the means which operates each of said metering pumps, for sensing the discharge pressure of said metering pumps and in response thereto, closing the electrical circuit starting the operation of said metering pumps when the discharge pressure thereof is less than the predetermined discharge pressure and opening the electrical circuit stopping the operation of said metering pumps when the discharge pressure thereof is greater than the predetermined discharge pressure.

3. A proportioning system particularly adaptable for feeding an epoxy resin and hardener therefor in accurately metered, volumetric proportions to a mixing and spraying head in which the epoxy resin and hardener are admixed and from which the admixed materials are discharged comprising separate containers for said epoxy resin and for said hardener, a positive displacement, volumetric metering pump connected to each container through a conduit, means for feeding each material from its container to the metering pump connected thereto, each of said metering pumps operating at a discharge pressure substantially equal to its intake pressure whereby each of said materials is fed through its metering pump under substantially zero pressure differential and to a mixing and spraying head in accurately metered, volumetric quantities, an electrical motor which starts and stops the operation of said metering pumps, a gear train mechanically linking said motor to said metering pumps and mechanically linking each metering pump to each other whereby said motor operates said metering pumps simultaneously, and pressure actuated, electrical switches, mounted at each metering pump and connected to each other and to said motor in electrical series, for sensing the discharge pressure at said metering pumps and in response thereto closing the electrical circuit starting the motor which operates the said metering pumps when the discharge pressure thereof is less than the predetermined discharge pressure, and opening the electrical circuit stopping the operation of the motor which operates the said metering pumps when the discharge pressure thereof is greater than the predetermined discharge pressure.

4. A proportioning system as defined in claim 1 wherein each sensing means is a pressure actuated, electrical switch.

References Cited in the file of this patent
UNITED STATES PATENTS

| | | |
|---|---|---|
| 1,760,070 | Kinsella | May 27, 1930 |
| 1,964,028 | Boynton et al. | June 26, 1934 |
| 2,273,125 | McFarland | Feb. 17, 1942 |
| 2,275,472 | Samiran | Mar. 10, 1942 |
| 2,564,306 | Isreeli et al. | Aug. 14, 1951 |
| 2,578,102 | Stephenson et al. | Dec. 11, 1951 |
| 2,880,909 | Clymer et al. | Apr. 7, 1959 |
| 2,931,538 | Young et al. | Apr. 5, 1960 |